(12) United States Patent
Erban et al.

(10) Patent No.: US 6,273,525 B1
(45) Date of Patent: Aug. 14, 2001

(54) METHOD AND DEVICE FOR DETERMINING A VALUE REPRESENTING THE SYSTEM PRESSURE IN A BRAKE CIRCUIT

(75) Inventors: Andreas Erban, Bietigheim-Bissingen; Karl-Josef Weiss, Stuttgart; Manfred Gerdes, Korntal-Muenchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/194,243
(22) PCT Filed: Mar. 10, 1998
(86) PCT No.: PCT/DE98/00692
§ 371 Date: Jul. 13, 1999
§ 102(e) Date: Jul. 13, 1999
(87) PCT Pub. No.: WO98/43860
PCT Pub. Date: Oct. 8, 1998

(30) Foreign Application Priority Data

Mar. 27, 1997 (DE) .............................. 197 12 889

(51) Int. Cl.[7] .............................. B60T 13/18; B60T 8/34
(52) U.S. Cl. .......................................... 303/11; 303/113.2
(58) Field of Search ........................... 303/10, 11, 113.2, 303/113.5, 116.2, 139

(56) References Cited

U.S. PATENT DOCUMENTS

| 5,131,730 | * | 7/1992 | Kollers et al. | 303/116.2 |
|---|---|---|---|---|
| 5,236,256 | * | 8/1993 | Schmidt et al. | 303/116.2 |
| 5,261,730 | * | 11/1993 | Steiner et al. | 303/113.4 |
| 5,281,012 | * | 1/1994 | Binder et al. | 303/113.5 |
| 5,342,120 | * | 8/1994 | Zimmer et al. | 303/113.2 |
| 5,390,994 | * | 2/1995 | Jonner et al. | 303/113.2 |
| 5,397,174 | * | 3/1995 | Willmann | 303/113.5 |
| 5,401,083 | * | 3/1995 | Altmann et al. | 303/113.4 |
| 5,586,814 | * | 12/1996 | Steiner | 303/116.2 |
| 5,826,950 | * | 10/1998 | Jonner et al. | 303/113.2 |
| 5,826,954 | * | 10/1998 | Schmitt et al. | 303/186 |
| 5,927,824 | * | 7/1999 | Pahl et al. | 303/113.2 |

FOREIGN PATENT DOCUMENTS

| 41 02 497 | 5/1992 | (DE) . |
|---|---|---|
| 43 40 921 | 6/1995 | (DE) . |
| 44 42 326 | 5/1996 | (DE) . |
| 196 11 360 | 9/1997 | (DE) . |

* cited by examiner

Primary Examiner—Christopher P. Schwartz
(74) Attorney, Agent, or Firm—Kenyon & Kenyon

(57) ABSTRACT

A method and a device for determining a quantity describing the brake circuit pressure, with which the brake circuit pressure is determined for a pressure buildup, in particular a pressure buildup independent of the driver, and also for a pressure reduction. In a pressure buildup independent of the driver, the delivery performance of the pump which delivers the brake medium and is detected with sensing means is taken into account in determining the brake circuit pressure. In a pressure reduction, the brake circuit pressure is determined as a function of a quantity which describes the brake circuit pressure to be expected after the pressure reduction.

21 Claims, 10 Drawing Sheets

METHOD AND DEVICE FOR DETERMINING A VALUE REPRESENTING THE SYSTEM PRESSURE IN A BRAKE CIRCUIT

FIELD OF THE INVENTION

The present invention relates to a method and a device for determining a quantity describing the system pressure in a brake circuit. The phrase "system pressure in a brake circuit" is equivalent to the term "brake circuit pressure" which is why the latter is used hereinafter.

BACKGROUND INFORMATION

Methods and devices for determining a quantity describing the brake circuit pressure are known in various versions from the related art.

German Patent Application No. 43 40 921 describes a brake pressure control system where the brake circuit pressure is estimated for each brake circuit. The hydraulic system disclosed in German Patent Application No. 43 40 921 has two brake circuits. Each of the two brake circuits has two wheels, each connected to the brake circuit by an intake valve and a discharge valve. Each brake circuit also has a precharge pump, a return pump, a return valve and a reversing valve. With the two pumps, a brake pressure can be generated upstream from the intake valves if a brake pressure is to be built up at the wheels. The return valve and the reversing valve are to be driven accordingly. The desired brake pressure can be achieved in the respective brake wheel with the intake and discharge valves assigned to the respective wheel. Based on one brake circuit, valve control signals are determined at least for the intake valves from setpoint brake pressures for the wheel brake cylinders. The brake cylinder pressures enter into the determination of the setpoint brake pressures, with the prevailing brake circuit pressure and the control times of the intake valves being taken into account in the determination of the brake cylinder pressures. The brake circuit pressure is estimated with the help of a recursive method. Distinction is made between two situations in estimating the brake circuit pressure. In one situation, the required pressure buildup is available, i.e., both the precharge pump and the return pump are receiving current, and the return valve and the reversing valve are connected accordingly. It is assumed that in this situation the two pumps are supplying a constant volume flow. The new value for the estimated brake circuit pressure is obtained as a function of the old estimated value for the brake circuit pressure, the control times of the intake valves in the brake circuit, the wheel brake cylinder pressures and the admission pressure set by the driver. In the other situation, both pumps are turned off. The new value for the estimated brake circuit pressure is obtained here as a function of the old estimated value for the brake circuit pressure and the admission pressure set by the driver. The old estimated value for the brake circuit pressure is weighted with a constant factor so that the resulting reduction in pressure in the brake circuit is simulated.

The method according to the present invention and the device for determining the quantity representing the brake circuit pressure according to the present invention can be used in combination with systems for controlling brake slip or drive slip and in combination with systems for controlling a quantity describing the driving dynamics of a vehicle. Systems for regulating drive slip or brake slip are described in a general form, for example, in the book "Bremsanlagen fur Kraftfahrzeuge" (Brake System for Motor Vehicles) published by Robert Bosch GmbH of Stuttgart, VDI Verlag, Dusseldorf, $1^{st}$ edition, 1994. Systems for controlling a quantity describing the driving dynamics of a vehicle are described, for example, in the article "FDR-Die Fahrdynamikregelung von Bosch" (Bosch Method of Regulating driving Dynamics) published in Automobiltechnische Zeitschrift (ATZ), (Automotive Engineering Journal) vol. 96, no. 11 (1994) pp. 674–689.

The object of the present invention is to improve the determination of a quantity describing the brake circuit pressure.

SUMMARY OF THE INVENTION

A brake system according to the present invention contains first means (e.g., a first arrangement) for each wheel brake cylinder having an intake valve and a discharge valve plus at least one storage chamber assigned to the respective brake circuit. Furthermore, the brake system contains second means for each brake circuit with which a pressure buildup can be achieved independently of the driver. These first and second means include at least one pump, a precharge valve and a discharge valve. It is possible to provide a motor for each pump or one motor for the two pumps together. In particular, it is also possible for a pump with two pump elements and one motor to be used in this connection, with one pump element being assigned to each brake circuit.

The advantage of the method according to the present invention and the device according to the present invention with regard to determination of a quantity representing the brake circuit pressure in a pressure buildup that is independent of the driver is that at least the pump delivery performance detected is taken into account in determining the quantity representing the brake circuit pressure. This pump delivery performance enters into a quantity describing the status of the brake circuit, with the quantity representing the brake circuit pressure being determined at least as a function of the quantity describing the status of the brake circuit during a pressure buildup that is independent of the driver.

The quantity describing the status of the brake circuit is advantageously determined at least as a function of the intake valves opened in the corresponding brake circuit or as a function of the value of the quantity representing the brake circuit pressure. In taking into account the intake valves opened in the corresponding brake circuit, a distinction is made first according to the number of intake valves opened and then according to the type of intake valves opened. A better simulation of the pressure actually prevailing in the brake circuit is achieved in determining the quantity representing the brake circuit pressure due to the differentiation according to type, i.e., differentiating whether the intake valve of a front wheel or the intake valve of a rear wheel is opened.

Likewise, a better simulation of the pressure actually prevailing in the brake circuit by the quantity representing the brake circuit pressure is achieved by taking into account the pump delivery performance during the pressure buildup that is independent of the driver. Various criteria are provided for determining the pump delivery performance during a pressure buildup that is independent of the driver. At least one criterion taken into account is whether the pump is in a startup phase. Another criterion taken into account here is at least one factor influencing the pump delivery rate resulting from the brake circuit pressure. Furthermore, another criterion taken into account is at least whether a pressure buildup that is independent of the driver is occurring in another brake circuit of the brake system while the pump is delivering. Then at least one factor for weighting the quantity describing the status of the brake circuit is determined as a function of at least one of these criteria. Thus the pump delivery performance during a pressure buildup that is independent of the driver enters into the quantity describing the status of the brake circuit.

In addition, it is advantageous, starting from the quantity describing the status of the brake circuit to determine a quantity which describes the change in brake circuit pressure over time. The instantaneous value for the quantity representing the brake circuit pressure is determined at least as a function of the quantity describing the change in brake circuit pressure over time or as a function of a previous value for the quantity representing the brake circuit pressure.

Moreover, in determining the quantity describing the change in brake circuit pressure over time, a quantity representing the volume delivered into the brake circuit through the precharge valve is taken into account. The quantity representing the volume delivered into the brake circuit through the precharge valve is determined to advantage from a quantity describing the triggering time of the precharge valve. The term "volume delivered" is understood to refer to the volume of brake medium delivered.

It is also advantageous in determining the quantity representing the volume delivered through the precharge valve into the brake circuit, to also take into account the volume of the brake medium stored in the storage chamber and supplied in a pressure reduction from the wheel brake cylinder to the storage chamber through the discharge valve assigned to the wheel brake cylinder. The brake medium stored in the storage chamber is taken into account in such a way that the quantity describing the triggering time of the precharge valve is influenced as a function of the volume of the brake medium stored in the storage chamber.

Another advantage is that in determining the quantity describing the status of the brake circuit, a quantity representing the transverse acceleration of the vehicle is also taken into account. High transverse acceleration can result in an air space so that brake medium is first delivered to the wheel brake cylinder in a pressure buildup that is independent of the driver in particular without generating a braking force acting on the corresponding wheel. This state of affairs is taken into account by taking into account the transverse acceleration of the vehicle.

Limiting the quantity representing the brake circuit pressure to a minimum value or a maximum value also yields another advantage. Limiting it to a minimum or maximum value ensures that the quantity determined representing the brake circuit pressure is within a physically reasonable range of values. The minimum value may be to advantage the pressure set by the driver, which is detectable with a sensor. The maximum value for the brake circuit pressure may be a quantity describing the pressure conditions of the reversing valve in the brake circuit.

It is advantageous when there is a drop (e.g., a reduction) in pressure in the brake circuit to determine the quantity representing the brake circuit pressure at least as a function of a quantity describing the brake circuit pressure to be expected after the drop (the reduction) in pressure. Furthermore, it is advantageous to take into account a quantity describing the pressure drop (e.g., a pressure reduction) conditions to be expected. When a pressure reduction takes place in a brake circuit, the quantity representing the brake circuit pressure is determined using a mathematical model which describes a low pass in particular.

DETAILED DESCRIPTION

Figure 1:
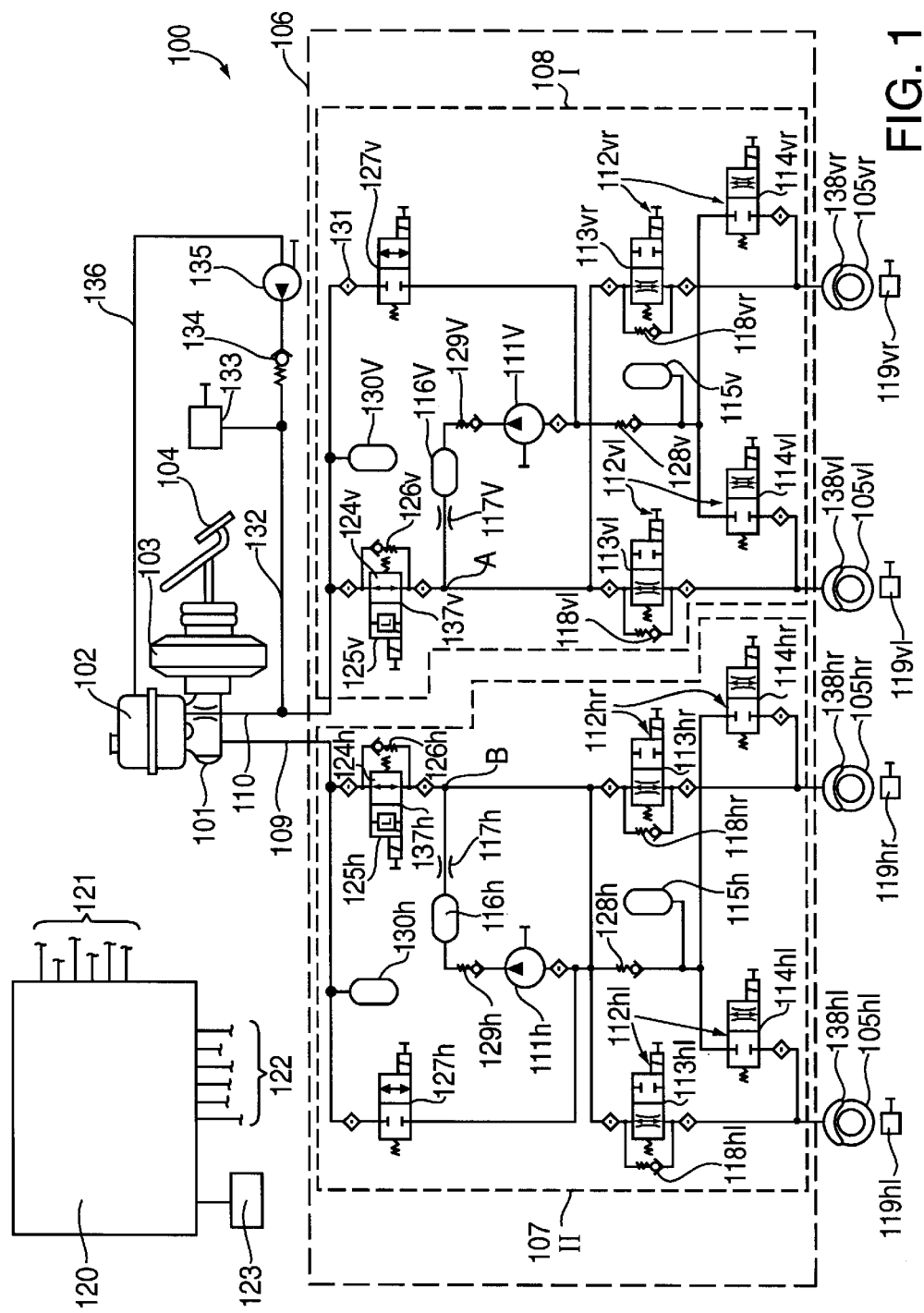
FIG. 1 shows a hydraulic diagram and a control unit of a brake system.

This embodiment is based on a brake system 100 in a vehicle as illustrated in FIG. 1. The brake system has a dual-circuit main brake cylinder 101 with a reservoir 102, a pneumatic brake booster 103, for example, and a brake pedal 104, as well as two brake circuits 107 and 108. Two wheels 105$hl$ and 105$hr$ plus respective actuators 138$hl$ and 138$hr$ are assigned to brake circuit 107. Two wheels 105$vl$ and 105$vr$ plus respective actuators 138$vl$ and 138$vr$ are assigned to brake circuit 108. A wheel slip control unit 106, also called a hydraulic unit, is arranged between main brake cylinder 101 and actuators 138$hl$, 138$hr$, 138$vl$ and 138$vr$. The actuators are the conventional wheel brakes, operable through a brake medium that can be fed into the respective wheel brake cylinder. Hereinafter, the simplified notation 105$ij$ will be used for the wheels of the vehicle. The index i indicates whether the wheel is on the rear axle (h) or on the front axle (v). The index j indicates the assignment to the right (r) or left (l) side of the vehicle. This characterization by two indices i and j is the same for all quantities and components with which they are used, e.g., actuators 138$ij$ and the respective valves and pumps in the brake system.

The division of the brake circuit shown in FIG. 1 is provided as a black-and-white division. This brake circuit division includes a first brake circuit I, labeled as 108, provided for front wheels 105$vj$ of the vehicle. In addition, the brake circuit division includes a second brake circuit II, labeled as 107, provided for rear wheels 105$hj$ of the vehicle. This brake circuit division is not intended to be any restriction. It is also possible to use the method according to the present invention and the device according to the present invention in a brake system with a different brake circuit division.

Main brake cylinder 101 is designed in a known manner, for example, and can be operated using brake pedal 104, thereby creating brake pressures in brake circuits 107 and 108. The effect exertable on main brake cylinder 101 by brake pedal 104 can be boosted by brake booster 103. Reservoir 102 supplies main brake cylinder 101 with hydraulic medium which can be forced out of main brake cylinder 101 in the direction of actuators 138$ij$ through hydraulic unit 106 for normal braking operation.

Hydraulic unit 106 is designed as a recirculating type for influencing wheel slip in the operation of brake pedal 104, having a return pump 111$h$ for brake circuit 107 and a return pump 111$v$ for brake circuit 108. Furthermore, hydraulic unit 106 has for each actuator 138$ij$ a separate brake pressure modulation valve arrangement 112$ij$, each with an intake valve 113$ij$ and a discharge valve 114$ij$, plus a storage chamber 115$i$ for each brake circuit 107 and 108, for example. In addition, a first damper chamber 116$h$ is provided for brake circuit 107 and a second damper chamber 116$v$ for brake circuit 108, as well as damper throttles 117$h$ and 117$v$. The motor required to drive return pumps 111$i$ is not shown in FIG. 1. It should be pointed out here that it is also possible to provide a separate motor for each return pump 111$i$. The physical arrangement of return pumps 111$i$ may also be implemented in various ways. First, it is possible to arrange the two return pumps so they are physically separated from one another. Second, it is possible to arrange return pumps 111$i$ so they are physically connected, thereby resulting in one pump with two "pump elements" 111$i$ in a figurative sense.

Starting with actuators 138$ij$, their respective intake valves 113$ij$ can be bypassed in the direction of main brake cylinder 101 using non-return valves 118$ij$ which can be opened in the direction of main brake cylinder 101 when there is a pressure gradient across the respective intake valve 113$ij$, e.g., when it is driven into its blocking position or when a respective throttle is operative in its normal open position.

When brake pedal 104 is operated and therefore brake pressure is supplied to actuators 138$ij$, wheel slip control operation is possible with the above-mentioned individual elements of hydraulic unit 106. Intake valves 113$ij$ between respective actuators 138$ij$ and main brake cylinder 101 are therefore normally in open position, so that pressure generated in main brake cylinder 101 by the operation of brake pedal 104 can normally reach actuators 138$ij$. Discharge valves 114$ij$ of brake pressure modulation valve arrangements 112$ij$ are also connected to actuators 138$ij$; they are closed in normal position and in the controlled position they permit throttled passage and are connected at the input end to return pump 111$h$ of brake circuit 107 and to return pump 111$v$ of brake circuit 108. Dampers 116$i$ are connected to return pumps 111$i$ at the output end. Damper chambers 116$i$ are followed by throttles 117$i$ in the direction of main brake cylinder 101 and respective intake valves 113$i$.

Hydraulic unit 106 also includes a control unit 120 and wheel rotation speed sensors 119$ij$ provided for wheels 105$ij$. Signals nij generated with the help of wheel rotation speed sensors 119$ij$ are sent to control unit 120. This is indicated in FIG. 1 by the electric lines leading away from wheel rotation speed sensors 119$j$ and by terminals 122 on the control unit, representing signals sent to the control unit. Additional sensors connected to control unit 120 are indicated by block 123. The pumps and valves already described as well as additional pumps and valves yet to be described are connected to control unit 120. This is indicated by terminals 121, which are intended to represent the control signals emitted by control unit 120, and by the electric lines on the valves and pumps.

Control unit 120 may be, for example, such a unit which is used to control brake slip or to control drive slip or to control a quantity describing the driving dynamics of the vehicle, in particular the yaw of the vehicle.

If, for example, a growing brake slip with an imminent tendency to skid is detected in control unit 120 for all wheels, control unit 120 activates return pumps 111$i$, closes all intake valves 113$ij$ and opens all the respective discharge valves 114$ij$. Consequently, a pressure which may still be increasing in main brake cylinder 101 does not reach actuators 138$ij$, but instead brake medium can flow out of these actuators 138$ij$ and into storage chambers 115$i$, thereby reducing or eliminating the risk of skidding. Then the brake medium flows out of storage chambers 115$i$ into return pumps 111$i$. Consequently these return pumps 111$i$ force brake medium back to main brake cylinder 101 through damper chambers 116$i$ and throttles 117$i$ by way of two reversing valves 137$i$.

Therefore, the pressure prevailing in the wheel brake cylinder is reduced by return pump 111$i$. After the risk of skidding is eliminated (it is assumed here that the risk of skidding disappears simultaneously on all wheels 105$ij$), brake pressure modulation valve arrangements 112$ij$ are brought into their basic positions as control unit 120 stops the supply of control currents required for reducing brake pressure. Likewise, control unit 120 also stops the power supply to two return pumps 111$i$.

Control unit 120 may also be equipped, for example, so that pressures in actuators 138$ij$ can be varied individually and independently when the risk of skidding differs on the various wheels.

For automatic braking, hydraulic unit 106 also has reversing valves 137$i$ which function as pass-through valves 124$i$ in a first position and as pressure control valves 125$i$ in a second position. Non-return valves 126$i$ are arranged in parallel with these reversing valves 137$i$. Non-return valves 126$i$ ensure that admission pressure Pvor set by the driver is made available. In addition, precharge valves 127$i$ and non-return valves 128$i$ are assigned to return pumps 111$i$ at the input end. At the output end, the return pumps are each connected to another non-return valve 129$i$. Damper chambers 130$i$ are provided between the connections of reversing valves 137$i$ and precharge valves 127$i$, which face main brake cylinder 101. At least one pump unit 135, in particular a precharge pump which is assigned to brake circuit 108 is provided to supply hydraulic unit 106 for automatic braking operation. To this end, a feeder line 132, in which a non-return valve 134 that can be opened toward main brake line 110 is installed, runs from pump unit 135 to a main brake line 110 between main brake cylinder 101 and hydraulic unit 106. Pump unit 135 is connected to reservoir 102 by a suction line 136. Between non-return valve 134 and main brake line 110 there is a sensor 133 which generates a signal representing admission pressure Pvor set by the driver.

Second brake circuit 107 is connected to main brake cylinder 101 via a main brake line 109 which is provided for it and runs between main brake cylinder 101 and hydraulic unit 106.

If control unit 120 detects, for example, that automatic braking, i.e., a pressure buildup that is independent of the driver, is necessary on at least one of front wheels 105$vj$, control unit 120 activates pump unit 135 so that the pump unit supplies brake medium to return pump 111$v$ through precharge valve 127$v$ which is opened electrically by control unit 120 at the same time, so that it makes available pressure for at least one actuator 138$vj$ when reversing valve 137$v$ is switched to operate as a pressure control valve 125v. An excessive increase in pressure in brake circuit 108 is prevented by pressure control valve 125v.

A similar procedure is followed when a pressure buildup that is independent of the driver is necessary with respect to rear wheels 105hj, but means corresponding to pump unit 135 are not available here. Return pump 111h is supplied with brake medium also in this brake circuit by displacement of the float piston in main brake cylinder 101.

The procedure described in conjunction with automatic braking corresponds to that carried out in a drive slip control case to prevent skidding of the driven wheels.

In addition to the components already described, the hydraulic unit also contains filters 131 at various locations, although they will not be discussed further here.

In conclusion, it should be pointed out regarding FIG. 1 that the black-and-white division of the brake system shown here is not intended as a restriction in any way; for example, a diagonal division of the brake system would also be conceivable. Furthermore, it is also conceivable to implement the described function of the brake system by using other components. In addition, the illustration of a hydraulic brake system is not restrictive. Use of the method according to the present invention or the device according to the present invention in conjunction with a pneumatic brake system would also be conceivable.

With the method according to the present invention and the device according to the present invention, the brake circuit pressure prevailing at point A, for example, can be determined for brake circuit 108, and the brake circuit pressure prevailing at point B can be determined for brake circuit 107.

The above-mentioned pressure buildup that is independent of the driver is implemented as an active or partially active pressure buildup; in both cases, the brake circuit pressure is greater than the brake pressure Pvor set by the driver.

Figure 2:
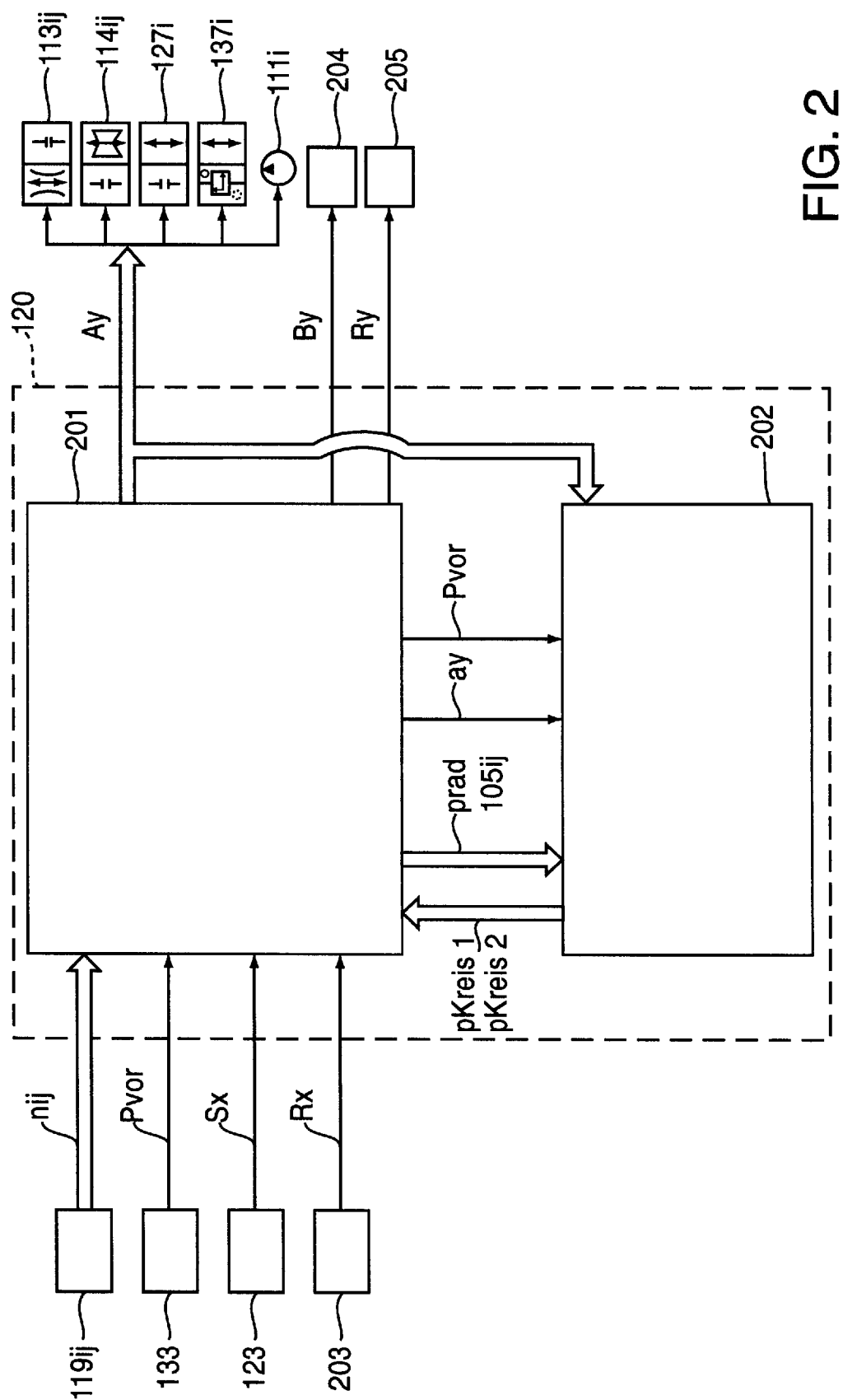
FIG. 2 shows a detailed illustration of the control unit.

FIG. 2 shows control unit 120 for the method according to the present invention and the device according to the present invention. Control unit 120 has a block 201 representing the controller core of the drive slip control system implemented in the vehicle. Wheel rotation speed nij determined with wheel rotation speed sensors 119ij are sent to this controller core 201. Furthermore, controller core 201 receives signal Pvor determined with the help of sensor 133, representing the brake pressure set by the driver. As already indicated in FIG. 1, additional signals Sx generated by additional sensors present in the vehicle and indicated by block 123 are sent to controller core 201. These additional sensors should include at least one sensor to detect the transverse acceleration acting on the vehicle. If the control system implemented in the vehicle is a system for controlling a quantity that describes the driving dynamics, in particular the yaw, block 123 represents at least one steering angle sensor, one yaw sensor or the above-mentioned transverse acceleration sensor.

Furthermore, additional controllers or control systems provided in the vehicle are also shown in block 203. Signals Rx generated with these controllers or control systems are also sent to controller core 201. Signals nij, Pvor, Sx and Rx are labeled as 122 in FIG. 1.

Control unit 120 also has a block 202 in which quantity pkreis1 representing the brake circuit pressure for brake circuit 108 and quantity pkreis2 representing the brake circuit pressure for brake circuit 107 are determined. Both brake circuit pressure value pkreis1 and brake circuit pressure value pkreis2 are sent from block 202 to block 201. To determine brake circuit pressures pkreis1 and pkreis2, at least values prad105ij describing the pressure prevailing in the respective wheel brake cylinder are sent from controller core 201 to block 202. Block 202 also receives from controller core 201 a signal ay describing the transverse acceleration acting on the vehicle, a signal Pvor describing the pressure set by the driver, and control signals Ay with which the valves and pumps in the brake system are controlled. Depending on the slip control system implemented in the vehicle, controller core 201 generates, as a function of input signals it receives, control signals Ay for controlling at least intake valves 113ij discharge valves 114ij, precharge valves 127i, reversing valves 137i and return pumps 111i in the brake system. Controller core 201 also generates additional control signals By for controlling pump unit 135, for example, in the brake system and additional components combined in block 204 in the vehicle. In addition, controller core 201 also generates signals Ry, which are sent to the additional controllers provided in the vehicle and indicated with block 205. Blocks 203 and 205 may contain either the same or different controllers.

Figure 3:
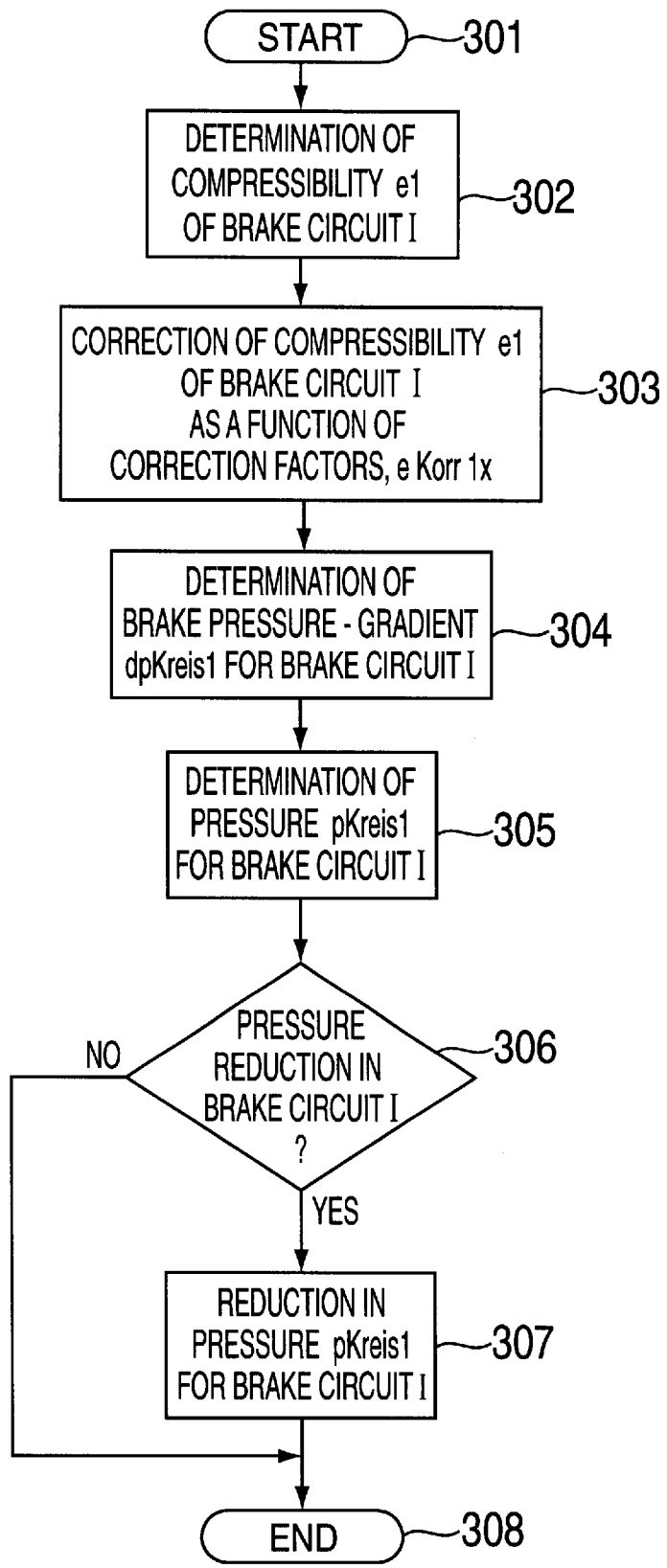
FIG. 3 shows steps for determining a quantity representing a brake circuit pressure for a method according to the present invention.

FIG. 3 shows with the help of a flow chart the method according to the present invention taking place in the device according to the present invention for determining the brake circuit pressure in brake circuit 108. Brake circuit 108 is hereinafter labeled as I. Selecting brake circuit 108 or I to describe the device according to the present invention or the method according to the present invention is not intended as a restriction. Brake circuit pressure in brake circuit 107, i.e., brake circuit II, can be determined in the same way as that in brake circuit I.

Determination of brake circuit pressure pkreis1 in brake circuit I starts at step 301. It is assumed here that there is a pressure buildup that is independent of the driver as described in conjunction with FIG. 1, i.e., that return pump 111v is pumping brake medium. When there is a pressure buildup that is independent of the driver, implemented by an active or partially active braking operation, the brake circuit pressure cannot be deduced directly from brake pressure Pvor predetermined by the driver as in a passive braking operation, i.e., in braking where the pressure implemented in the wheel brake cylinders is determined directly by the driver via the brake pedal. In the normal case, the pressure prevailing in the brake circuit in passive braking corresponds to brake pressure Pvor set by the driver. This relationship no longer holds in a pressure buildup that is independent of the driver, because in this case the brake circuit is separated from main brake cylinder 101 by reversing valve 137v, and information regarding brake pressure Pvor set by the driver is no longer available.

Step 302 is carried out after step 301. In step 302, a quantity describing the status of brake circuit I is obtained. This quantity describing the status of brake circuit I may be compressibility e1 of brake circuit I, for example. Compressibility e1 describes for brake circuit I the relationship between the change in pressure in brake circuit I and the change in volume taking place in brake circuit I. Step 302 is followed by step 303. In step 303, compressibility e1 of brake circuit I is corrected as a function of correction factors ekorr1x obtained for brake circuit I. As explained in greater detail below, the delivery performance of return pump 111v during a pressure buildup that is independent of the driver, for example, enters into the determination of the correction factors. Step 304 is carried out following step 303. In step 304, a pressure gradient dpkreis1 describing the increase in brake circuit pressure pkreis1 during a pressure buildup that is independent of the driver is determined for brake circuit I. After step 304, step 305 is carried out. In this step, pressure pkreis1 for brake circuit I is determined. Following step 305, an inquiry is executed in step 306. This inquiry ascertains in step 306 whether there is a pressure drop in brake circuit I. If there is a pressure drop in brake circuit I, step 307 is performed next. In this step, quantity pkreis1 describing the brake circuit pressure is reduced for brake circuit I. Following step 307, step 308 is carried out, terminating the method according to the present invention. However, if it is found in step 306 that there is no pressure drop in brake circuit I, step 308 is carried out immediately following step 306.

The method according to the present invention illustrated in FIG. 3 is running permanently in the background of the control system implemented in the vehicle. This means that in the normal case, step 301 is carried out again following step 308.

Figure 4:
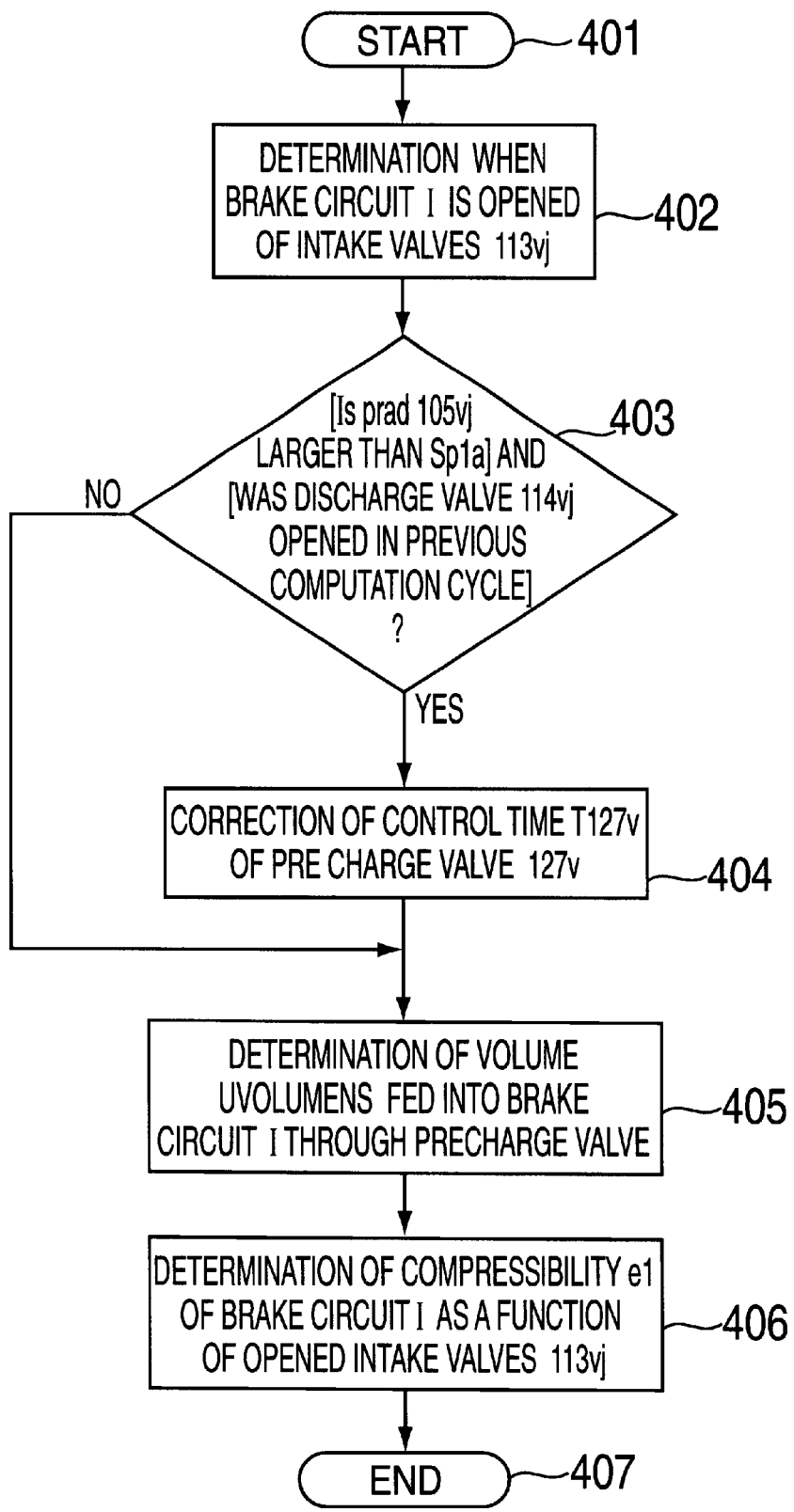
FIG. 4 shows steps for determining a quantity describing a status of a brake circuit.

Using the flow chart illustrated in FIG. 4, the determination of compressibility e1 for brake circuit I which is performed in step 302 is described in greater detail. Furthermore, FIG. 4 shows the determination of the volume of brake medium fed into brake circuit I through precharge valve 127v. Determination of compressibility e1 begins with step 401. Following step 401, intake valves 113vj opened in brake circuit I are determined. Intake valves 113vj thus opened can be determined on the basis of control signals Ay output by controller core 201. Determination of opened intake valves 113vj in general yields both the number and the type of opened intake valves in brake circuit I. In other words, one first obtains information regarding whether one or both intake valves or no intake valve is opened. Second, one obtains information regarding whether the intake valve of a front wheel or that of a rear wheel has been opened. The information regarding the type and number of opened intake valves 113vj is important because compressibility e1 is different according to the type and number of intake valves opened. The influence of the number of intake valves 113vj opened on compressibility e1 is such that compressibility e1 is greater, if fewer intake valves are opened. Determination of the type of opened intake valves 113vj is not important in conjunction with the described black-and-white division of brake system 100 because, in determining compressibility e1 for brake circuit I and compressibility e2 for brake circuit II, it is already known that with this brake circuit division, brake circuit I has only front wheels and brake circuit II has only rear wheels. To this extent, determination of the number of opened intake valves 113vj would be sufficient for the described brake circuit division because the type of intake valves 113vj is known in advance. It is important to determine the type of intake valves 113vj opened, for example, with a diagonal division of the brake circuits. If only one intake valve of a front wheel is opened, the compressibility assumes smaller values than when only one intake valve of a rear wheel is opened. This is due to the fact that the wheel brake cylinder of a front wheel can usually accommodate a larger volume.

Following step 402, an inquiry is performed in step 403. The inquiry performed in step 403 determines for wheels 105vj whether pressure prad105vj in the respective wheel brake cylinders is greater than a threshold value Sp1a. At the same time, it determines for wheels 105vj whether the respective discharge valve 114vj was opened in the preceding computation cycle. The first inquiry determines whether there is brake medium at all in the wheel brake cylinder belonging to wheel 105vj. The second inquiry determines whether brake medium is in storage chamber 115v because of previously opened discharge valves 114vj. If both inquiries are satisfied at the same time in step 403, step 404 is performed next. However, if both inquiries are not satisfied at the same time in step 403, step 405 is carried out next.

In step 404, control time T127v of precharge valve 127v is determined first from control signals Ay. Since both inquiries were satisfied at the same time in step 403, it can be assumed that there is brake medium in storage chamber 115. This brake medium is fed into brake circuit I in addition to the volume fed into brake circuit I through precharge valve 127v. To also take into account the brake medium in storage chamber 115v in determining pressure pkreis1 for brake circuit I, control time T127v of precharge valve 127v is corrected in step 404. Control time T127v is corrected as a function of the volume of the brake medium in storage chamber 115 in such a way that control time T127v is lengthened progressively with an increase in volume. In correcting control time T127v, the volume of brake medium in storage chamber 115v is not determined directly, but instead it is taken into account as a measure of the volume associated with pressure prad105vj prevailing in wheel brake cylinder of wheel 105vj.

Step 405 is carried out following step 404. In this step, volume uvolumen1 fed into brake circuit I through precharge valve 127v is determined. Volume uvolumen1 fed into brake circuit I is obtained, for example, from corrected control time T127v of precharge valve 127v and the delivery of return pump 111v per unit of time. It is advisable here to limit the value of the volume uvolumen1 fed into brake circuit I to a value which is predetermined by the design of return pump 111v. Step 405 is followed by step 406. In step 406 compressibility e1 is determined for brake circuit I as a function of opened intake valves 113vj and as a function of the instantaneous value of brake circuit pressure pkreis1 for brake circuit I. As indicated previously in conjunction with step 402, both the number and type of opened intake valves 113vj are taken into account here. Determination of compressibility e1 is terminated by step 407, which follows step 406.

Figure 5A:
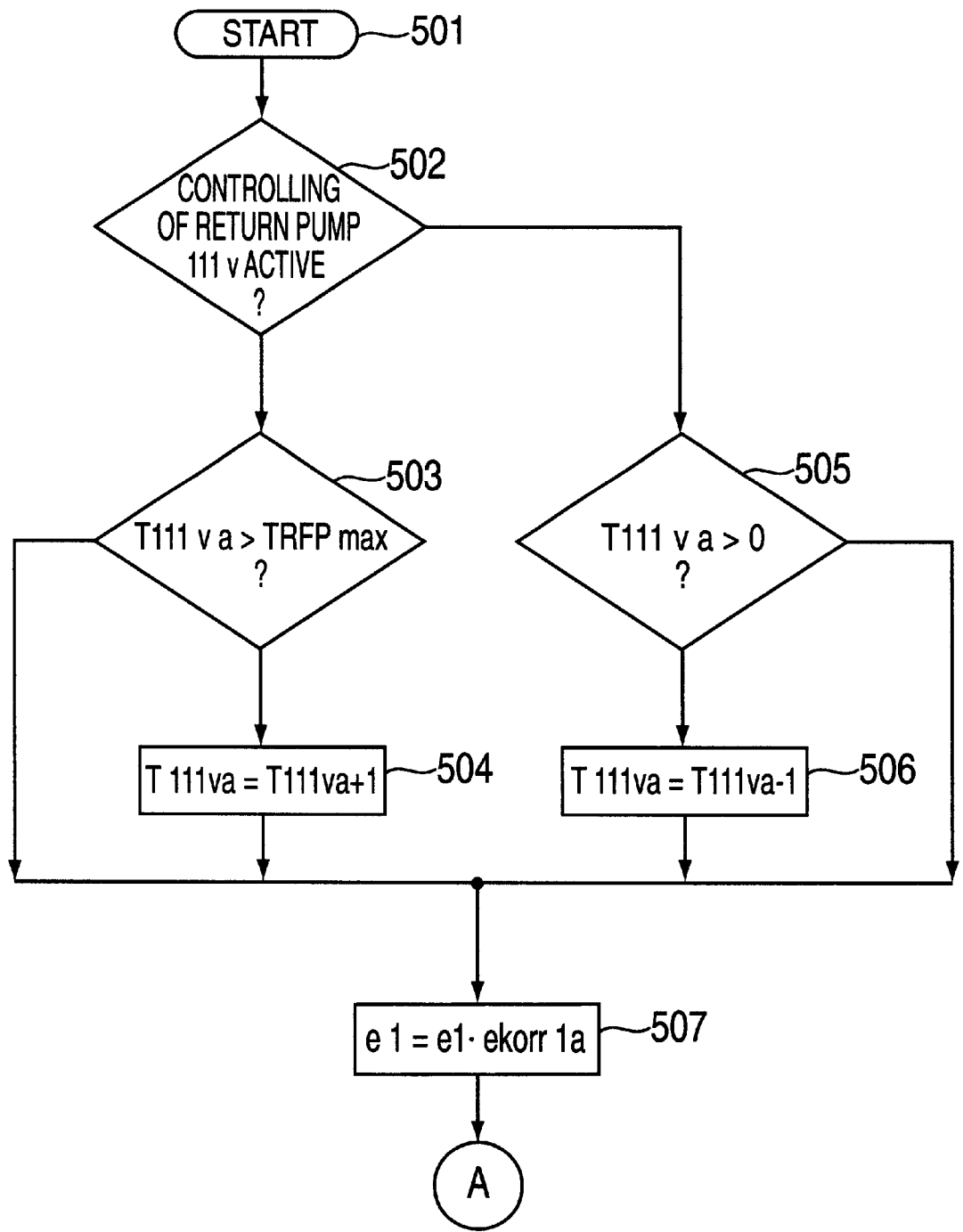
Fig. 5a shows a first portion of steps of a particular method to determine a pump delivery performance during a pressure buildup that is independent of a driver and a resulting determination of the quantity describing the status of the brake circuit, and how a transverse acceleration of the vehicle is taken into account in determining the quantity describing the status of the brake circuit.
Figure 5B:
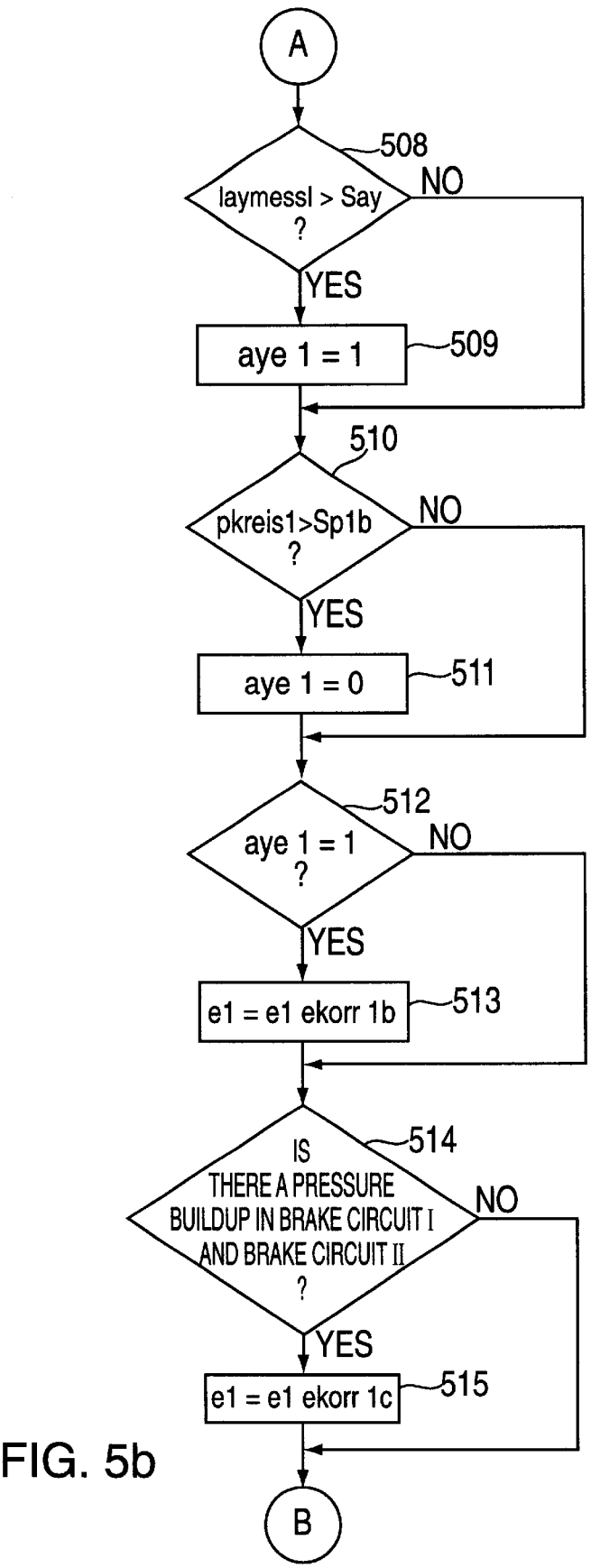
FIG. 5b shows a second portion of steps of the particular method.
Figure 5C:
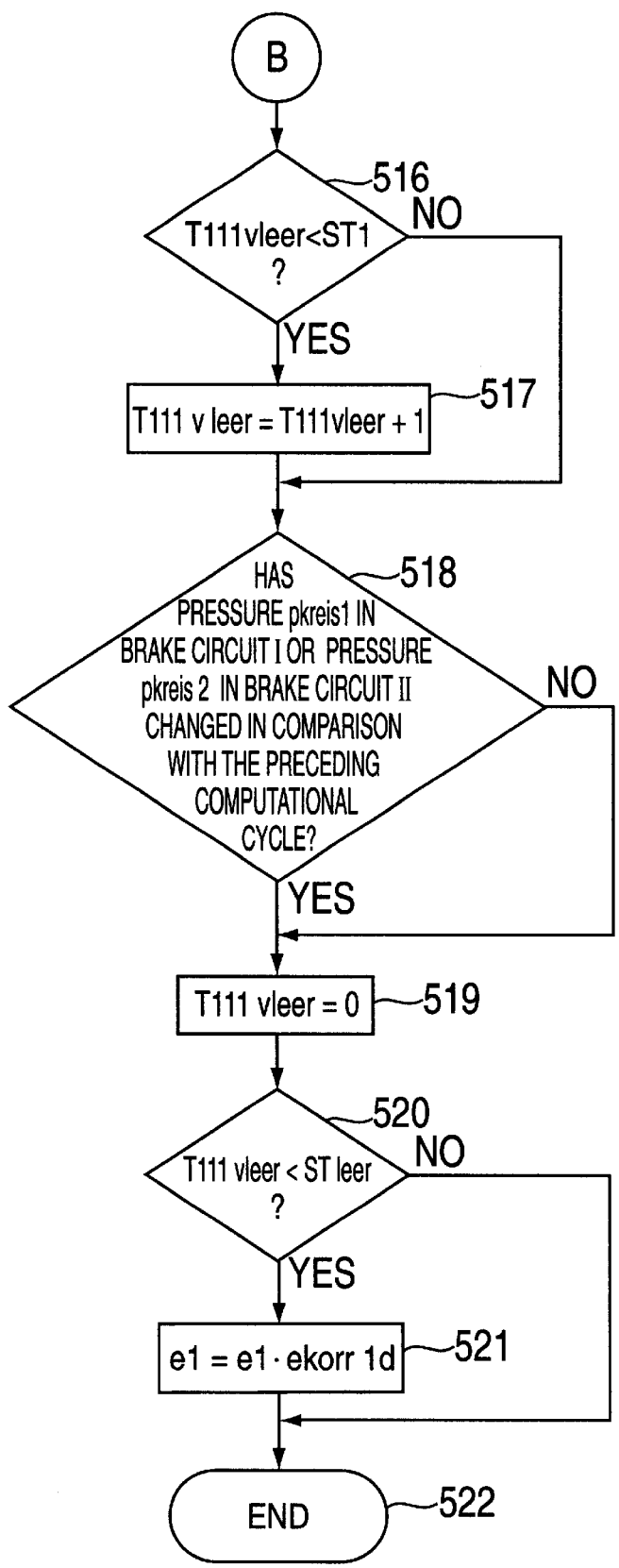
FIG. 5c shows a third portion of steps of the particular method.

FIGS. 5a–5c illustrate a flow chart showing in greater detail the correction of compressibility e1 for brake circuit I performed in step 303.

Essentially two things are taken into account in correcting compressibility e1. First, the detected delivery performance of return pump 111v during the pressure buildup that is independent of the driver is taken into account and second a transverse acceleration acting on the vehicle is also taken into account.

The delivery performance of return pump 111v is also taken into account for the following reason. As shown in step 405, volume uvolumen1 fed into brake circuit I through precharge valve 127v is determined. As will be shown below, this volume enters into the determination of brake circuit pressure pkreis1. Volume uvolumen1 fed into brake circuit I through precharge valve 127v depends to a great extent on the delivery performance of return pump 111v during the pressure buildup that is independent of the driver. It is assumed in the normal case that return pump 111v has a constant delivery rate which is reduced by a known constant factor in only a few situations. However, this factor may also not be known in advance or it may be variable. To simulate the actual delivery performance of return pump 111v more accurately and thus improve the determination of brake circuit pressure pkreis1, these situations are detected and the deviation in delivery performance of return pump 111v during the pressure buildup that is independent of the driver from the ideally assumed constant delivery performance is taken into account by the correction of compressibility e1.

The term "run up" used below in conjunction with return pump 111ν is to be understood as meaning that the speed and delivery rate increase during run-up of a pump until the pump has reached its characteristic delivery rate, i.e., the pump has run up.

The transverse acceleration acting on the vehicle is taken into account for the following reason. At a high transverse acceleration, the pistons of the wheel brake cylinders may be forced into the brake cylinders. To force the pistons back out of the wheel brake cylinder, return pump 111ν must force brake medium into the wheel brake cylinder, which is thus not available for a pressure increase in brake circuit I. This effect on brake circuit pressure pkreis1 in brake circuit I is taken into account by a correction of compressibility e1 as a function of the transverse acceleration acting on the vehicle.

Correction of compressibility e1 starts in step 501. Then the inquiry performed in step 502 is carried out. The inquiry performed in step 502 determines whether the controlling of return pump 111ν is active. This inquiry can be carried out by analyzing control signals Ay generated by controller core 201, for example. If it is found in step 502 that the controlling of return pump 111ν is active, step 503 is performed next. In step 503, a counter T111va representing the period of time during which return pump 111ν has already been controlled is compared with a limit value TRFPmax which describes the period of time after which it can be assumed that return pump 111ν has run up. If it is found in step 503 that counter T111va is smaller than limit value TRFPmax, which is equivalent to finding that return pump 111ν has not yet run up, step 504 is performed next, incrementing counter T111va by 1. Following step 504, step 507 is carried out. However, if it is found in step 503 that counter T111va is greater than limit value TRFPmax, which is equivalent to finding that return pump 111ν has run up, then step 507 is carried out after step 503.

However, if it is found in step 502 that controlling of return pump 111ν is not active, step 505 is carried out next. In step 505, counter T111va is compared with the value 0. This inquiry determines whether return pump 111ν is still running, although it is no longer being controlled. If it is found in step 505 that counter T111va is greater than 0, which is equivalent to finding that return pump 111ν is still running, then step 506 is carried out next, decrementing counter T111va by 1. Following step 506, step 507 is carried out. However, if it is found in step 505 that counter T111va is not greater than 0, which is equivalent to finding that return pump 111ν is no longer running, then step 507 is carried out after step 505.

In step 507, first a correction value eKorr1a for compressibility e1 is determined as a function of counter T111va and limit value TRFPmax. In step 507, a corrected value for compressibility e1 is determined as a function of the value determined in step 406 for compressibility e1 and correction value ekorr1a. For example, the corrected value for compressibility e1 is obtained by multiplying the value for compressibility e1 determined in step 406 by correction factor eKorr1a. Correction factor eKorr1a can be determined as follows, for example. If it is found in step 505 that counter T111va is not greater than 0, the value 0 is assigned to correction factor eKorr1a. If it is found in step 503 that counter T111va is greater than limit value TRFPmax, the value 1 is assigned to correction factor eKorr1a. For values of counter T111va between 0 and TRFPmax, a value between 0 and 1 accordingly is assigned to correction factor eKorr1a. Assigning values to correction factor eKorr1a in this way achieves the result that compressibility e1 is greater, the longer return pump 111ν runs. If return pump 111ν is not running (T111va is not greater than 0), compressibility e1 is corrected to 0, because return pump 111ν is not pumping any brake medium. If return pump 111ν has run up (T111va is greater than limit value TRFPmax), compressibility e1 is effectively not corrected, because return pump 111ν has reached its characteristic delivery rate.

The inquiry performed in steps 502 through 507 determines at least whether or not return pump 111ν is in a start-up phase.

Following step 507, step 508 is carried out. The value of quantity aymess representing the transverse acceleration acting on the vehicle is compared with a threshold value Say in step 508. If the absolute value of quantity aymess is greater than threshold value Say, step 509 is carried out after step 508. In step 509, the value 1 is assigned to status vector aye1. Step 510 is carried out after step 509. However, if it is found in step 508 that the absolute value of quantity aymess is not greater than threshold Say, then step 510 is carried out after step 508. Threshold value Say in this connection is a quantity above which it can be assumed that the pistons of the wheel brake cylinders are being forced back into the cylinders due to the great transverse acceleration.

A check is performed in step 510 to determine whether brake circuit pressure pkreis1 determined for brake circuit I is greater than a threshold value Sp1b. This inquiry is to ascertain whether brake circuit pressure pkreis1 prevailing in brake circuit I is sufficient to force the pistons back out of the wheel brake cylinders. This is the case when brake circuit pressure pkreis1 is greater than threshold value Sp1b. If it is found in step 510 that brake circuit pressure pkreis1 is greater than threshold value Sp1b, step 511 is carried out after step 510, assigning the value 0 to status vector aye1. Step 512 is carried out after step 511. However, if it is found in step 510 that brake circuit pressure pkreis1 is not greater than threshold value Sp1b, step 512 is carried out after step 510.

An inquiry is performed in step 512 to determine whether the value 1 has been assigned to status vector aye1. If the value 1 has been assigned to status vector aye1, this means that the pistons of the wheel brake cylinders have been forced into the cylinders and brake circuit pressure pkreis1 is not sufficient to force the pistons back out of the wheel brake cylinders, and thus the brake medium delivered by return pump 111ν at the start of the pressure buildup that is independent of the driver must be applied to force the pistons out of the wheel brake cylinders and thus cannot make any contribution toward generating a braking force. To take this fact into account, step 513 is performed following step 512 if status vector aye1 has assumed a value of 1. In step 513, compressibility e1 is corrected with a factor ekorr1b. Correction factor ekorr1b is determined as a function of measured transverse acceleration aymess. Step 514 is performed after step 513.

However, if it is found in step 512 that a value of 1 has not been assigned to status vector aye1, which is equivalent to finding that the pistons of the wheel brake cylinders have not been forced into the cylinders, step 514 is performed after step 512.

The disk tilt space or air space created in a brake system due to high transverse acceleration is taken into account by the inquiries performed in steps 508 through 513 and by correcting compressibility e1.

Step 514 determines whether there is a pressure buildup in brake circuit I and brake circuit II simultaneously. This inquiry is performed because the speed of return pump 111ν is reduced in a dual-circuit brake pressure buildup. If it is found in step 514 that there is a pressure buildup in both brake circuit I and brake circuit II, a step 515 is carried out after step 514, correcting compressibility e1 with a correction factor ekorr1c. Step 516 is carried out after step 515. However, if it is found in step 514 that there is not a pressure buildup in brake circuit I and brake circuit II simultaneously, then step 516 is carried out after step 514.

Consequently, it is found, depending on step 514 and step 515 whether a pressure buildup that is independent of the driver is taking place in a brake circuit other than brake circuit I of the brake system while return pump 111$v$ of brake circuit I is pumping.

In step 516, a counter T111vleer describing the delivery time of return pump 111$v$ during which return pump 111$v$ is delivering brake medium is compared with a reference value ST1. The larger the value of counter T111vleer, the sooner it can be assumed that return pump 111$v$ is running at its idling speed. In this case, the delivery rate of return pump 111$v$ is independent of its speed. However, if the speed of return pump 111$v$ is lower than its idling speed, it must be assumed that its delivery rate is speed-dependent.

If counter T111vleer is lower than reference value ST1, which is equivalent to return pump 111$v$ not having reached its maximum speed yet owing to the condition in brake circuit I, then step 517 is carried out following step 516, incrementing counter T111vleer by 1. A step 518 is carried out after step 517. However, if it is found in step 516 that counter T111vleer is greater than reference value ST1, which is equivalent to return pump 111$v$ having reached its maximum speed, step 518 is carried out following step 516. An inquiry is performed in step 518 to determine whether brake circuit pressure pkreis1 in brake circuit I or brake circuit pressure pkreis2 in brake circuit II has changed in comparison with the preceding computation cycle. If it is found in this inquiry that brake circuit pressure pkreis1 in brake circuit I or brake circuit pressure pkreis2 in brake circuit II has changed in comparison with the previous computation cycle, then step 519 is performed next, assigning a value of 0 to counter T111vleer. If brake circuit pressure pkreis1 in brake circuit I on brake circuit pressure pkreis2 in brake circuit II has changed in comparison with the preceding computation cycle, it can be assumed that return pump 111$v$ is no longer pumping at the maximum speed, which is why a value of 0 is assigned to counter T111vleer in step 519. Both brake circuits are taken into account in this inquiry, because the speed of return pump 111$v$ is influenced first directly by the status of brake circuit I, and second is influenced indirectly by the status of brake circuit II by way of the motor driving both return pumps 111$i$.

Step 520 is carried out following step 519. However, if it is found in step 518 that neither brake circuit pressure pkreis1 in brake circuit I nor brake circuit pressure pkreis2 in brake circuit II has changed in comparison with the preceding computation cycle, step 520 is carried out after 518.

Counter T111vleer is compared with a threshold value STleer in step 520. If counter T111vleer is smaller than threshold value STleer, which is equivalent to return pump 111$v$ no longer running at its idling speed and thus delivery rate of return pump 111$v$ being dependent upon speed, a step 521 is carried out following step 520, correcting compressibility e1 with a factor eKorr1d. The influence on compressibility e1 due to the speed-dependent delivery rate of return pump 111$v$ is taken into account with this correction of compressibility e1. At least the value of brake circuit pressure pkreis1 enters into the determination of correction factor eKorr1a. Following step 521, step 522 is carried out, terminating the correction of compressibility e1.

However, if it is found in step 520 that counter T111vleer is not lower than threshold value STleer, which is equivalent to return pump 111$v$ running at its idling speed and thus delivery rate of return pump 111$v$ not being dependent upon speed, then step 522 is carried out after step 520.

Consequently, in forming compressibility e1, the dependence of the delivery rate of return pump 111$v$ at least on brake circuit pressure pkreis1, which results when there is a pressure buildup that is independent of the driver, is taken into account with the help of steps 516 through 521. Consequently, the delivery rate of return pump 111$v$ during a pressure buildup that is independent of the driver is thereby measured.

It is also possible to perform only some of the corrections described in FIGS. 5a–5c.

Figure 6:
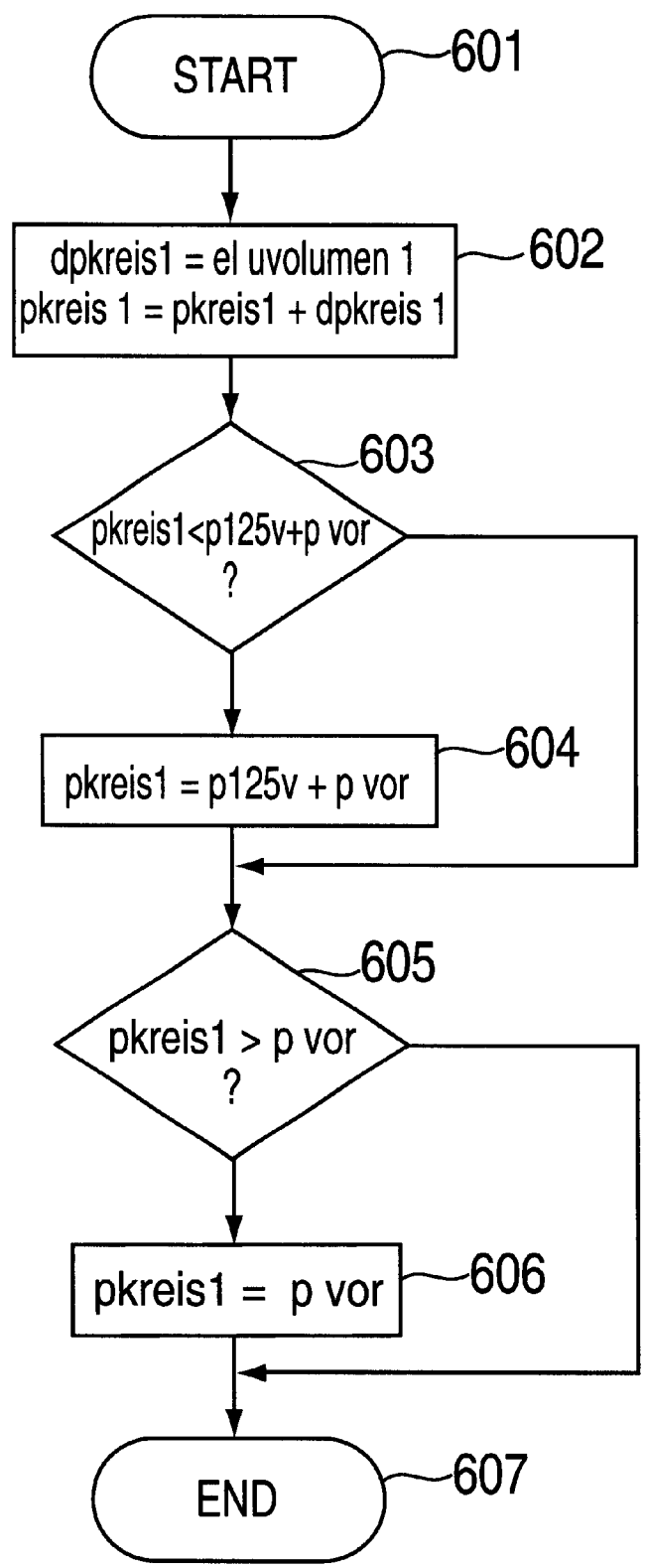
FIG. 6 shows steps for determining a value of the quantity representing the brake circuit pressure.

FIG. 6 shows a flow chart illustrating in greater detail the determination of pressure gradient dpkreis1 for brake circuit I in step 304 and the determination of pressure pkreis1 for the pressure of brake circuit I in step 305. The determinations begin with step 601. Step 602 is carried out after step 601. In this step, pressure gradient dpkreis1 for brake circuit I is determined as a function of compressibility e1 and volume uvolumen1 which is fed into brake circuit I through precharge valve 127$v$. Pressure gradient dpkreis1 is obtained, for example, by multiplying compressibility e1 by volume uvolumen1. Compressibility e1 here is the corrected compressibility as obtained according to FIG. 5. Volume uvolumen1 is the volume determined in step 405. Likewise, in step 602 the instantaneous value of brake circuit pressure pkreis1 is determined from the preceding value of brake circuit pressure pkreis1 and pressure gradient dpkreis1. This takes place, for example, by deriving the instantaneous value from the preceding value by adding the pressure gradient to it. Step 603 is carried out after step 602. In step 603, a plausibility inquiry is performed for the instantaneous value of brake circuit pressure pkreis1. To do so, the instantaneous value of brake circuit pressure pkreis1 is compared with the sum of value p125v and brake pressure Pvor set by the driver. Quantity p125v describes the pressure condition of pressure control valve 125$v$, which is contained in reversing valve 137$v$. In other words, quantity p125v represents the pressure in brake circuit I above which pressure control valve p125v connects brake circuit I to main brake cylinder 101 to reduce the brake circuit pressure prevailing in the brake circuit. If it is found in step 603 that the instantaneous value of brake circuit pressure pkreis1 is greater than the sum of p125v and Pvor, which is not plausible, then step 604 is carried out, assigning the sum of p125v and Pvor to the instantaneous value of brake circuit pressure pkreis1. A step 605 is carried out after step 604. However, if it is found in step 603 that the instantaneous value of brake circuit pressure pkreis1 is lower than the sum of p125v and Pvor, which is plausible, then step 605 is carried out after step 603.

In step 605, the instantaneous value of brake circuit pressure pkreis1 is compared with admission pressure Pvor set by the driver. If there is no pressure buildup that is independent of the driver in brake circuit I, admission pressure Pvor set by the driver is fed into brake circuit I through non-return valve 126$v$. This circumstance is taken into account by the inquiry performed in step 605. If it is found by the inquiry in step 605 that the instantaneous value for the pressure in brake circuit I is lower than admission pressure Pvor set by the driver, which is not plausible, then following step 605, a step 606 is carried out, assigning admission pressure Pvor set by the driver to the instantaneous value for brake circuit pressure pkreis1. Following step 606, step 607 is carried out, concluding the determination of pressure gradient dpkreis1 and the determination of brake circuit pressure pkreis1. However, if it is found in step 605 that the instantaneous value of brake circuit pressure pkreis1 is greater than the admission pressure set by the driver, which is plausible, then step 607 is carried out following step 605.

Figure 7:
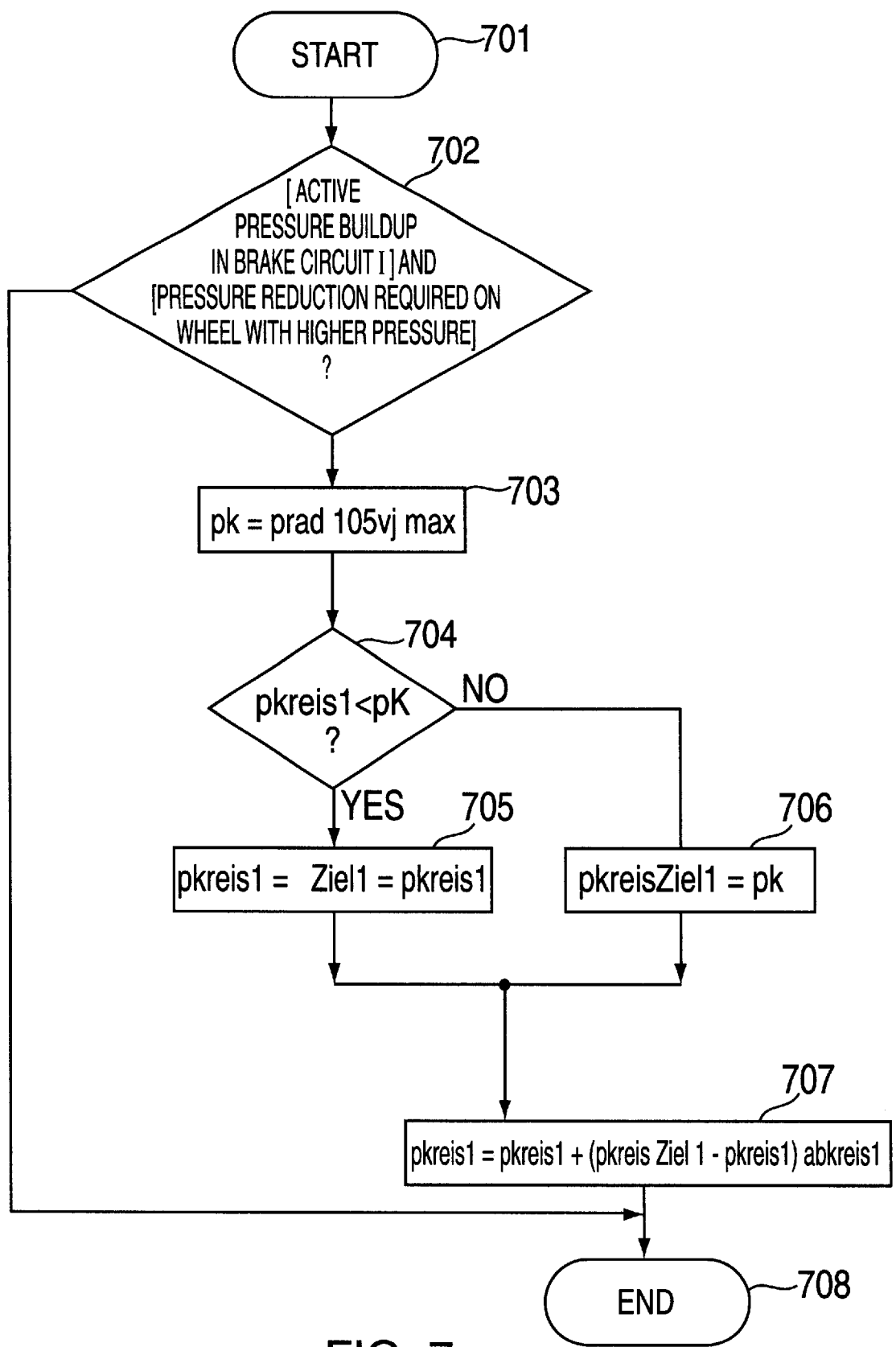
FIG. 7 shows a first method for determining the quantity representing the brake circuit pressure in a case of a pressure reduction in the brake circuit.
Figure 8:
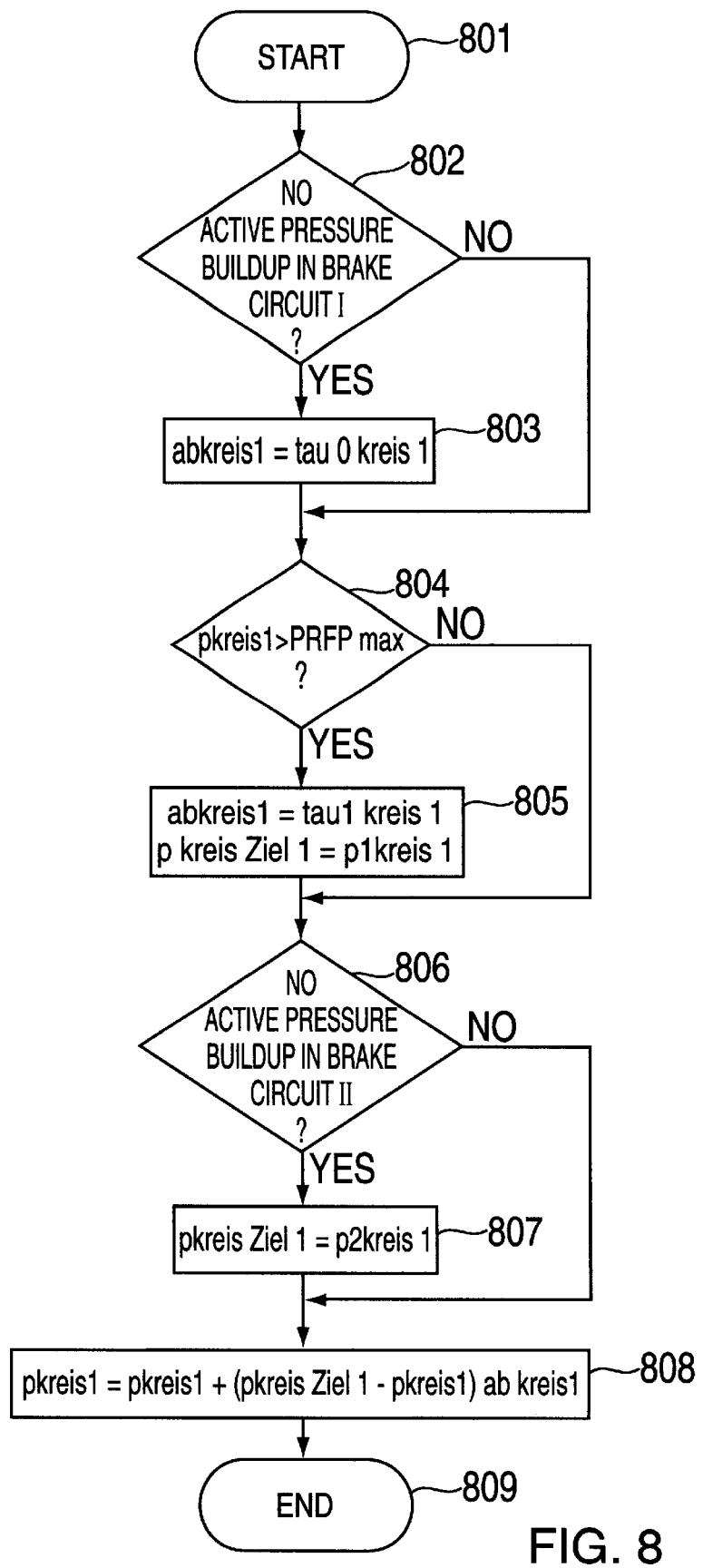
FIG. 8 shows a second method for determining the quantity representing the brake circuit pressure in a case of the pressure reduction in the brake circuit.

FIGS. 7 and 8 illustrate in greater detail the inquiry performed in step 306 to determine whether there is a pressure drop in brake circuit I as well as the reduction in pressure pkreis1 for brake circuit I performed in step 307 for the case of a pressure build up in brake circuit I. FIG. 7 shows the procedure used when the actual brake circuit pressure of brake circuit I is reduced within an active pressure buildup, i.e., a buildup that is independent of the driver. FIG. 8 shows the procedure used when the actual brake circuit pressure in brake circuit I is reduced outside the control system, i.e., outside a pressure buildup that is independent of the driver or after conclusion of a pressure buildup performed independently of the driver.

The reduction in pressure pkreis1 determined for brake circuit I for the case of a reduction in the circuit pressure actually prevailing in brake circuit I within a control operation starts with step 701. A step 702 is carried out after step 701. The inquiry performed in step 702 determines whether there is an active pressure buildup, i.e., a buildup independent of the driver, in brake circuit I and whether a pressure reduction is required in the wheel with a higher pressure in brake circuit I during this pressure buildup that is independent of the driver. It is possible to determine whether a pressure buildup that is independent of the driver is occurring in brake circuit I by starting with control signals from return pump 111v, for example. It is possible to determine whether a pressure reduction is required in the wheel with the higher pressure in brake circuit I using an inquiry of the control signals of discharge valves 114vj. If it is found in step 702 that there is a pressure buildup that is independent of the driver in brake circuit I and a pressure reduction is required in the wheel with the higher pressure in brake circuit I at the same time, then step 703 is carried out following step 702. Value prad105vjmax of the wheel brake cylinder pressure of the wheel with the higher pressure in brake circuit I is assigned to a buffer memory pk step 703. A step 704 is performed after step 703. An inquiry in step 704 determines whether determined value pkreis1 of the brake circuit pressure for brake circuit I is smaller than the value of buffer memory pk. If value pkreis1 of the brake circuit pressure is lower than the value in the buffer memory, value pkreis1 is assigned in step 705 to variable pkreisZiel1, describing the brake circuit pressure to be expected after the pressure reduction. A step 707 is carried out following step 705.

If, however, it is found in step 704 that value pkreis1 for the brake circuit pressure of brake circuit I is greater than the value in buffer memory pk, a step 706 is carried out after step 704, assigning the value in buffer memory pk to variable pkreisZiel1. Step 707 is carried out after step 706.

In step 707, value pkreis1 of the brake pressure established during the pressure reduction in brake circuit I is determined on the basis of instantaneous value pkreis1 of the brake circuit pressure for brake circuit I as well as value pkreisZiel1 and a quantity abkreis1 describing the pressure drop behavior in brake circuit I. The determination of the value of the brake circuit pressure selected in step 707 can be compared with a filtering of value pkreis1 with a low-pass filter. A step 708 is carried out following step 707.

However, if it is found in step 702 that a pressure buildup that is independent of the driver in brake circuit I and a pressure reduction in the wheel of brake circuit I having the higher pressure are not required at the same time, then step 708 is carried out following step 702. Determination of brake circuit pressure pkreis1 for brake circuit I during the pressure reduction is concluded with step 708.

Determination of brake circuit pressure pkreis1 shown in FIG. 8 for the case when there is a pressure reduction outside the control system or after a pressure buildup that is independent of the driver in brake circuit 1 begins with step 801. Step 802 is carried out after step 801.

Step 802 determines whether there is an active pressure buildup, i.e., that is independent of the driver, in brake circuit I. This can be done, for example, by an inquiry of the control signal of return pump 111v. If it is found in step 802 that there is no active pressure buildup, i.e., that is independent of the driver, in brake circuit I, then a step 803 is carried out following step 802. In step 803, a value tau0kreis1 is assigned to quantity abkreis1 which describes the expected pressure drop behavior. Quantity tau0kreis1, which can be regarded as a time constant in this regard, describes a slow reduction in brake circuit pressure pkreis1. A step 804 is carried out after step 803. However, if it is found in step 802 that there is an active pressure buildup in brake circuit I, i.e., that is independent of the driver, then step 804 is carried out after step 802.

Step 804 determines by inquiry whether value pkreis1 of the brake circuit pressure in brake circuit I is greater than a threshold value PRFPmax, which describes the maximum pressure of precharge pump 111v. If it is found that value pkreis1 of brake circuit pressure is greater than this threshold value, then a step 805 is carried out after step 804. A value tau1kreis1, which describes the expected pressure drop behavior, is assigned in step 805 to quantity abkreis1. Value tau1kreis1 represents a time constant for a pressure reduction which takes place at an average rate of reduction. Furthermore, a value p1kreis1, which describes the brake circuit pressure to be expected after the pressure reduction, is assigned in step 805 to quantity pkreisZiel1. This value p1kreis1 is preferably a small value. Following step 805, a step 806 is carried out. However, if it is found in step 804 that value pkreis1 of the brake circuit pressure in brake circuit I is smaller than threshold value PRFPmax, then step 806 is carried out following step 804.

Step 806 inquires whether an active pressure buildup, i.e., that is independent of the driver, is taking place in brake circuit II. If it is found in step 806 that there is no pressure buildup that is independent of the driver in brake circuit II, then a step 807 is carried out following step 806. A value p2kreis1 is assigned in step 807 to quantity pkreisziel1. Value p2kreis1 represents a low pressure value which is expected after the pressure reduction. Value p2kreis1 is smaller than value p1kreis1. A step 808 is carried out after step 807. However, if it is found in step 806 that there is an active pressure buildup in brake circuit II, a step 808 is carried out after step 806.

In step 808, value pkreis1 of the brake circuit pressure of brake circuit I is determined as described previously in conjunction with step 707. Determination of brake circuit pressure pkreis1 is concluded with step 809 which follows step 808.

With regard to the flow charts shown in the figures, the equations shown in individual steps do not represent actual mathematical equations but may instead be assignments. Furthermore, the exemplary embodiment of the method according to the present invention and the device according to the present invention selected for illustration in the figures are not restricting in any way.

What is claimed is:

1. A brake system in a vehicle, the vehicle including at least one wheel associated with a wheel brake cylinder, comprising:
   a first arrangement adjusting at least one of a pressure buildup state, a pressure holding state and a pressure reduction state of the wheel brake cylinder;
   at least one brake circuit coupled to the wheel brake cylinder via the first arrangement, the at least one wheel being assigned to the at least one brake circuit, the at least one brake circuit including at least one second arrangement which has at least one pump, the at least one pump providing the pressure buildup state in the wheel brake cylinder of one of the at least one wheel independent of a driver action,
   a third arrangement determining a specific quantity which represents a pressure of the at least one brake circuit; and
   a fourth arrangement detecting a delivery performance of the at least one pump during the pressure buildup state independent of the driver action,
   wherein the third arrangement determines the specific quantity as a function of the detected delivery performance during the pressure buildup state independent of the driver action.

2. The brake system according to claim 1, further comprising:
   a sixth arrangement determining a change quantity indicative of a change in the pressure of the at least one brake circuit over time as a function of a status quantity representing a status of the at least one brake circuit,
   wherein the third arrangement determines an instantaneous value of the specific quantity as a further function of the change quantity and a preceding value of the specific quantity.

3. The brake system according to claim 2, further comprising:
   a main brake cylinder, wherein the at least one second arrangement includes at least one valve providing a brake medium from the main brake cylinder into the wheel brake cylinder using the at least one pump,
   wherein the sixth arrangement determines the change quantity as a further function of a volume quantity representing a volume of the brake medium delivered into the at least one brake circuit through the at least one valve.

4. The brake system according to claim 3, wherein the volume quantity is determined as a further function of a control quantity representing a control time of the at least one first valve.

5. The brake system according to claim 4, further comprising:
   a storage device receiving the volume of the brake medium, wherein the control quantity is controlled as a function of the volume of the brake medium.

6. The brake system according to claim 3, wherein the at least one valve includes a precharge valve.

7. The brake system according to claim 3,
   wherein the at least one brake circuit includes at least one storage chamber which receives the brake medium from the wheel brake cylinder, the first arrangement providing the brake medium in the pressure reduction state, and
   wherein the volume quantity is determined as a function of the volume of the brake medium.

8. The brake system according to claim 1, wherein the specific quantity is at least one of a minimum value and a maximum value.

9. The brake system according to claim 8, further comprising:
   a main brake cylinder,
   wherein the at least one second arrangement includes a valve, the at least one pump pumping a brake medium from the wheel brake cylinder, through the valve and into the main brake cylinder, and
   wherein the third arrangement determines the specific quantity using a valve quantity which represents a pressure characteristic of the valve, the valve quantity having the maximum value.

10. The brake system according to claim 9, wherein the valve includes a reversing valve.

11. The brake system according to claim 8, further comprising:
    a sensor detecting a further pressure which is set in the at least one brake circuit by a driver,
    wherein the third arrangement utilizes the further pressure as the minimum value.

12. The brake system according to claim 1, further comprising:
    a fifth arrangement determining a status quantity representing a status of the at least one braking circuit as a function of the delivery performance, wherein the specific quantity is determined as a further function of the status quantity.

13. The brake system according to claim 12, wherein the status quantity is indicative of a compressibility of the at least one brake circuit.

14. The brake system according to claim 12,
    wherein the first arrangement includes at least one intake valve, and
    wherein the status quantity is determined as a function of one of a number of the at least one intake valve opened in the at least one brake circuit and the specific quantity.

15. The brake system according to claim 1, wherein the fourth arrangement detects the delivery performance using at least one particular criteria, the at least one particular criteria including at least one of:
    determining if the at least one pump is in a start-up phase,
    determining a dependence of a pump delivery rate resulting from the pressure of the at least one brake circuit, and
    determining if another brake circuit of the brake system is in the pressure buildup state while the at least one pump is pumping, and
    wherein the fourth arrangement evaluates at least one factor representing a status quantity indicative of a status of the at least one brake circuit as a function of the at least one particular criterion.

16. The brake system according to claim 1,
    wherein the fourth arrangement detects the delivery performance as a further function of an acceleration quantity which represents a transverse acceleration acting on the vehicle, and
    wherein the fourth arrangement determines a status quantity which represents a status of the at least one brake circuit.

17. The brake system according to claim 1, further comprising:
- at least one controller controlling at least one of a brake slip of the vehicle, a drive slip of the vehicle and a movement quantity representing a movement of the vehicle, the at least one controller processing the specific quantity.

18. A brake system in a vehicle, the vehicle including at least one wheel assigned to a wheel brake cylinder, comprising:
- a first arrangement adjusting at least one of a pressure buildup state, a pressure holding state and a pressure reduction state of the wheel brake cylinder;
- at least one brake circuit coupled to the wheel brake cylinder via the first arrangement, the at least one wheel being assigned to the at least one brake circuit;
- a second arrangement determining a first quantity representing a first pressure of the at least one brake circuit; and
- a third arrangement determining a second quantity representing a second pressure of the at least one brake circuit expected after the pressure reduction state,
  - wherein, during the pressure reduction state, the second arrangement determines the first quantity as a function of the second quantity.

19. The brake system according to claim 18, wherein the second arrangement determines the first quantity using a mathematical model which models a low pass filter.

20. A method for determining a first quantity representing a pressure of a brake circuit in a brake system, comprising the steps of:
- increasing a pressure of a wheel brake cylinder assigned to at least one wheel independently of a driver action;
- detecting a delivery performance of a pump;
- determining a second quantity representing a status of the brake circuit; and
- when the pressure is increasing, determining the first quantity as a function of the second quantity,
- wherein, when the pressure is increasing, the second quantity is determined as a function of the delivery performance independent of the driver action.

21. A method for determining a first quantity representing a first pressure of a brake circuit of a brake system, comprising the steps of:
- decreasing the first pressure of a wheel brake cylinder assigned to at least one wheel;
- determining a second quantity representing a second pressure of the brake circuit expected after the first pressure is decreased; and
- when the first pressure is decreasing, determining the first quantity as a function of the second quantity.

* * * * *